United States Patent Office 3,284,479
Patented Nov. 8, 1966

3,284,479
ORGANIC POLYISOCYANATES
Erwin Windemuth, Kuno Wagner, and Otto Bayer, Leverkusen, and Hans Joachim Hennig, Cologne-Stammheim, Germany, assignors to Farbenfabriken Bayer Aktiengesellschaft, Leverkusen, Germany, a German corporation
No Drawing. Filed Nov. 26, 1963, Ser. No. 326,224
Claims priority, application Germany, Nov. 29, 1962, F 38,417
4 Claims. (Cl. 260—453)

This invention relates to organic polyisocyanates and more particularly to organic polyisocyanates which contain biuret groups, a method for the preparation thereof and to polyurethane plastics prepared from these organic polyisocyanates containing biuret groupings.

Organic polyisocyanates which have at least two and preferably more than two —NCO groups in the molecule are very important for the production of polyurethane plastics which may be either homogeneous or porous. In German Patent 1,101,394, it has been proposed to prepare biuret polyisocyanates which are particularly useful for the preparation of lacquers, coatings and adhesives. The polyurethane products are very valuable because of their solubility in organic solvents and dimensional stability at elevated temperatures. Another type of polyisocyanate which has urethane groups instead of the biuret structure is prepared by reacting an excess of an organic diisocyanate with a polyhydric alcohol.

Polyisocyanates containing biuret linkages can also be produced by reacting diamines with organic polyisocyanates; but the reaction takes place in an unpredictable manner with the formation of insoluble polyureas and often cross-linked products. Moreover, the heretofore known biuret polyisocyanates based on diamines often contain undesirable and highly colored secondary reaction products.

It is therefore an object of this invention to provide organic polyisocyanates containing a biuret structure which are substantially devoid of the foregoing disadvantages. Another object of this invention is to provide a method of preparing high molecular weight organic polyisocyanates which contain a biuret linkage and substantially no insoluble products. Another object of this invention is to provide organic polyisocyanates containing a biuret grouping which have improved solubility in organic solvents. Still another object of this invention is to provide a method of preparing organic polyisocyanates which contain biuret groupings. Another object of this invention is to provide polyurethane plastics containing a biuret grouping and carbamyl groupings. Another object of this invention is to provide polyurethane coating compositions which have improved stability to light and improved resistance to degradation by organic solvents. Still a further object of this invention is to provide cellular polyurethane plastics which have improved resistance to light.

The foregoing objects and others which will become apparent from the following description are accomplished in accordance with the invention, generally speaking, by providing carbamyl biuret polyisocyanates and polyurethane plastics prepared therefrom. Thus, this invention contemplates new biuret polyisocyanates which, in addition to the heretofore known biuret groupings, contain a substituted carbamyl group, =N—CO—, and a process for the preparation thereof. Still further, the invention contemplates polyurethane plastics prepared from these carbamyl biuret polyisocyanates.

The carbamyl biuret polyisocyanates of the invention preferably have the following formula

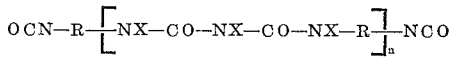

wherein X is hydrogen or —CO—NX—R—NCO, R is a divalent organic radical and $n$ is a positive integer of 1 to 4. At least one X inside the brackets in the formula is a —CO—NX—R—NCO group and it is only necessary that where there are repeating units that only one X in one unit be a —CO—NX—R—NCO group. Thus, a preferred isocyanate is one having the formula

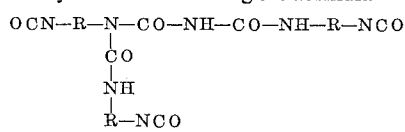

or the formula

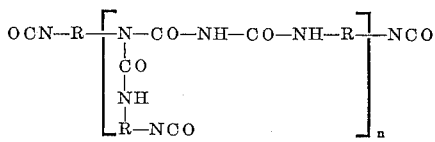

wherein R is obtained by removing the —NCO groups from an organic diisocyanate, preferably hexamethylene diisocyanate, cyclohexane diisocyanate, or toluylene diisocyanate. In the first formula, it is possible for the two additional hydrogen atoms shown as bonded to nitrogen atoms in the main chain to be substituted by

—CO—NH—R—NCO groups, but where in the second formula, $n$ is 2 to 4, only one grouping —CO—NH—R—NCO is preferably present in each repeating unit as the substituent X.

Generally speaking, the process for the preparation of the new carbamyl biuret polyisocyanates is characterized by reaction of at least 1.5 mols of an organic diisocyanate per mol of ammonia or precursor of ammonia and at an elevated temperature at least toward the end of the reaction. It is preferred to use from about 3 to about 4 mols of organic diisocyanate per mol of ammonia. When ammonia is used herein, it is intended to include the compound whether it is present as such initially or whether it is generated from a compound which splits off ammonia. The reaction may pass through intermediate stages preparing first an isocyanate with urea groups or an isocyanate with biuret groups and then completing the reaction in a second stage.

In carrying out the process, it is desirable to introduce the required quantity of ammonia into the required excess of organic diisocyanate. The quantity of ammonia may be easily determined by weight or in special cases and if the temperature is suitably controlled, the quantity of ammonia may be determined by continuously determining the —NCO content of the reaction mixture. There is generally some evolution of heat when the ammonia is first introduced into the organic diisocyanate and this may be adjusted by the rate of addition of the ammonia which may be advantageously mixed with an inert gas such as nitrogen or the reaction mixture may be cooled to control the evolution of heat.

The temperature at which the reaction is carried out depends on the type of organic diisocyanate used. Suitable temperatures are preferably within the range of about 50 to about 200° C. and at least toward the end of the reaction it is preferred to use a temperature in the upper end of this range of, for example, 120 to 200° C. When using toluylene-2,4-diisocyanate for reaction with ammonia, it is preferred to use a temperature in the range of from about 80 to about 120° C. When using hexamethylene diisocyanate, it is preferred to use a temperature of from about 120 to about 180° C. at least toward the end of the reaction.

The reaction may be carried out in a solvent, but the solvent should be inert, i.e. nonreactive with —NCO groups under the reaction conditions employed. It is preferred that the solvent not contain any hydrogen atoms that could react with —NCO groups. Suitable solvents are, for example, esters or acetic acid such as ethyl acetate, ketones such as methyl ethyl ketone, ethers such as tetrahydrofuran, dioxane and the like, ethylene glycol monomethyl ether acetate, chlorinated aliphatic, hydroaromatic or aromatic hydrocarbons such as trichloroethane, chlorocyclohexane, monochlorobenzene and the like.

If a large excess of an organic diisocyanate is used, then the excess may serve as a solvent for the products of the process. Use of large excesses for this purpose is particularly suitable.

It is also possible to use a catalyst in order to shorten the reaction time, particularly toward the end of the reaction when the product has passed through the stage of an isocyanate with a biuret structure. The catalysts should be those which promote carbamate formation. Catalysts which promote urea formation for example, tertiary amines or compounds which are alkaline in reaction including alkali metal alcoholates or alkali metal hydroxides should be avoided because they tend to cause polymerization and the formation of isocyanurate rings. Heavy metal compounds which are soluble in organic solvents are preferred including, for example, tin compounds such as dibutyl tin dilaurate, dibutyl di-2-ethyl hexoate, dibutyl diacetate, stannous octoate, stannous oleate, ferric acetyl actonate, titanium tetrabutylate and the like.

There are several preferred methods of carrying out the process of the invention including several two-stage preparations, for example, one may react about 1 mol of an organic diisocyanate in a first stage with about 1 mo. of ammonia over a generally wide temperature range, preferably from about 0° C. to about 80° C. and the initial reaction product which may or may not be isolated, is then treated with at least about 2 mols of an organic diisocyanate, preferably at an elevated temperature of from about 80 to about 200° C. The intermediate product may be represented by the general formula $$OCN-R-NH-CO-NH_2$$

wherein R is obtained by removing the —NCO groups from the organic diisocyanate used. Alternately, the process of the invention could start with these isocyanate intermediate products. In this method, it is possible also that an excess of the organic diisocyanate is present in a first stage, but if an excess is present, the initial reaction temperature should be below about 30° C. in order to insure that not more than about 1 mol of organic diisocyanate will enter into the reaction and that the excess organic diisocyanate will not react with the intermediate product until the second stage of the process which is at an elevated temperature. Following this procedure insures the formation of organic polyisocyanate having a carbamyl biuret structure.

In still another method, one may react $n$ mols of an organic diisocyanate ($n$ equals 2 to 5) at a first stage with $n$ minus 1 mols of ammonia, preferably at a temperature of from about 0° C. to about 80° C. to prepare an intermediate product which may or may not be isolated and then treating the intermediate product at an elevated temperature, preferably in the range of from about 80 to about 200° C. to prepare a carbamyl biuret polyisocyanate. The intermediate reaction product which again may be used as a starting point for the process of the invention may be represented by the formula

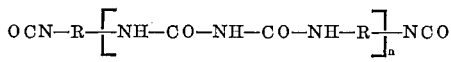

where R is obtained by removing the —NCO groups from an organic diisocyanate and $n$ is an integer of from 2 to 5. Here again an excess of organic diisocyanate may be present from the beginning provided that the reaction temperature is controlled preferably below about 30° C. so that not more than $n$ mols of organic diisocyanate will react with $n$ minus 1 mols of ammonia.

In another method of carrying out the process of the invention, about 2 mols of ammonia are added to 1 mol of an organic diisocyanate in a first stage, preferably at a temperature of from about 0° C. to about 80° C. to produce an $\omega,\omega'$-diurea which is then further reacted either with or without isolation with at least about 3 mols of an organic diisocyanate at an elevated temperature, preferably in the range of from about 80 to about 200° C. Here again the preformed $\omega,\omega'$-diurea may be used as a starting point for the process of the invention.

It is always possible to use a large excess of organic diisocyanate in the final stages for example, five times the required quantity of organic diisocyanate may be used and the excess will then serve as a solvent for the carbamyl biuret polyisocyanates.

It is most preferred to use a temperature between about 0 to about 10° C. in the initial stages of the three special methods given above.

It is also possible to react ammonia together with water with an organic diisocyanate and in this case, mixtures of products according to the invention will be primarily obtained, i.e. mixtures of polyisocyanates having the carbamyl biuret structure and polyisocyanates having only biuret linkages as described in German Patent 1,101,394 will be obtained. The somewhat increased viscosity of the mixtures is a desirable property for certain purposes.

The products prepared by these processes are preferably such that the number of —NCO groups in the molecule of the end product is equal to the number of mols of diisocyanate added per mol of ammonia. The end products thus differ from one another merely by their molecular weight but there is no substantial difference between them with regard to the —NCO content. It is preferred when there is a very great difference in the reactivity of the isocyanate groups of the starting material that the —NCO content of the end product correspond to approximately half of the —NCO value of the starting material.

Which structure is mainly formed depends not only on the structure of the diisocyanate but also on the reaction conditions employed. At low temperatures and using diisocyanates with an equal number of —NCO groups, polyisocyanates with a biuret structure are mainly formed at first, and they may contain several biuret groups, and further diisocyanate may be added to the molecule at higher temperatures to form polyisocyanates with a carbamyl structure.

Any suitable organic diisocyanate may be used either herein alone or mixed with other organic isocyanates, the organic diisocyanate may have two —NCO groups which have the same reactivity or one may use an organic diisocyanate having —NCO groups which differ in their reactivity and it is preferred to use the latter type. The organic diisocyanate may, for example be an aliphatic, aromatic or the like. The following are examples of those isocyanates which have —NCO groups that have substantially the same reactivity: tetramethylene diisocyanate, hexamethylene diisocyanate, decamethylene diisocyanate, cyclohexane-1,4 - diisocyanate, dicyclohexylmethane-4,4′ - diisocyanate, meta-xylylene diisocyanate, para-xylylene diisocyanate, meta-phenylene diisocyanate, para-phenylene diisocyanate, a diphenylmethane-4,4'-diisocyanate such as, diphenyl dimethyl methane-4,4'-diisocyanate, 3,3'-dimethoxy diphenyl methane-4,4'-diisocyanate, 3-methyl diphenyl methane-4,4'-diisocyanate and the like, 1,3-diisocyanatomethyl cyclobutane and the like. The folowing are examples of polyisocyanates whose —NCO groups differ in their reactivity: toluylene-2,4-diisocyanate, toluylene - 2,6 - diisocyanate, 1 - chlorobenzene-2,4-diisocyanate, 1-methyl cyclohexane-2,4-diisocyanate, 1-methyl cyclohexane-2,6-diisocyanate and the like.

It is also possible to use in addition to the organic diisocyanates, organic monosiocyanates such as phenyl isocyanate, benzyl isocyanate, butyl isocyanate, hexyl isocyanate and the like or polyisocyanates which have more than two —NCO groups per molecule such as, for example, p,p',p''-triphenylmethane triisocyanate, or the like provided that these isocyanates are used in smaller proportions than the amount of organic diisocyanate used. It is preferred that the organic diisocyanates and indeed all polyisocyanates be nonpolymeric or, in other words, monomeric compounds.

Instead of using free ammonia and preferably gaseous ammonia, it is possible to use precursors of ammonia, or in other words, compounds which split off ammonia such as ammonium carbonate, ammonium bicarbonate, carbamic acid, formamide, ammonium trichloroacetate and the like. The quantity of the precursor to be used is calculated according to the quantity of ammonia given off.

The carbamyl biuret polyisocyanates may be either liquid or solid. The aromatic diisocyanates usually produce crumbly resins whereas aliphatic diisocyanates usually produce more or less viscous liquids. Any monomeric isocyanates left in the product may be removed by extraction with solvents which will dissolve the monomeric isocyanates but will not dissolve the products of the invention such as aliphatic hydrocarbons, for example n-hexane, cyclohexane and the like. The same effect may be obtained by treating the products of the invention at reduced pressures in thin layer evaporators. It is desirable to produce a carbamyl biuret polyisocyanate which is free of unreacted monomeric diisocyanates because the latter may be harmful due to their physiological action, particularly when the carbamyl biuret polyisocyanates are used to prepare coating compositions and the like.

It is sometimes desirable to prepare a compound capable of splitting to reform the isocyanates of the invention by reacting the carbamyl biuret polyisocyanates with a compound which will form an adduct thereof that will split at a relatively low temperature, for example, with phenol, cresol, malonic acid esters such as malonic acid methyl ester, diphenyl amine caprolactams and the like. These compounds could be represented by a general formula as set forth above where the free —NCO groups have been reacted, for example with phenol so that urethane groups replace the terminal isocyanate groups.

The carbamyl biuret polyisocyanates of the invention, either in the pure state or in a crude state, for example, where they are mixed with other polyisocyanates including other biuret polyisocyanates, are valuable starting materials for the production and/or modification of polyurethane plastics. They are particularly suitable for the preparation of coating compositions and polyurethane foams which are light-fast. Another reason for their use in coating compositions is their excellent solubility in organic solvents including those which may be used in their preparation as more particularly set forth above. Furthermore, they are very compatible with the organic compounds containing active hydrogen containing groups which are normally reacted with polyisocyanates including, for example, polyesters, polyethers, polythioethers, polyacetals and the like. The invention is most useful for the preparation of polyurethane plastics by the reaction of these new carbamyl biuret polyisocyanates with an organic compound containing active hydrogen containing groups as determined by the Zerewitinoff method.

Any suitable organic compound containing at least two active hydrogen containing groups as determined by the Zerewitinoff method may be used. Generally speaking, any compound having an active hydrogen atom as defined above will react with an —NCO group may be used. Hydroxyl groups react with —NCO groups to yield urethane groups whereas carboxylic acids yield amide groups and amines yield ureas. The alcoholic group is strongly preferred because it is readily available and yields a stronger urethane linkage than a phenolic type hydroxyl group. Moreover, to prepare polyurethane plastics, it is preferred to have an organic compound of the type specified above which contains a plurality of active hydrogen containing groups and preferably at least some alcoholic hydroxyl groups. It is to be understood that when the above terminology is used, active hydrogen containing compounds are contemplated which may contain any of the following types of active hydrogen containing groups, among others, —OH, —NH$_2$, —NH, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including both aromatic, aliphatic and heterocyclic diamines, triamines, tetramines and the like; as well as mixtures thereof. Of course compounds which contain two or more different groups within the above-defined classes may also be used in accordance with the process of the present invention such as, for example, amino alcohols which contain an amino group and a hydroxyl group, amino alcohols which contain two amino groups and one hydroxyl group and the like. Also, compounds may be used which contain one —SH group and one —OH group or two —OH groups and one —SH group as well as those which contain an amino group and an —SH group and the like.

The molecular weight of the organic compound containing at least two active hydrogen containing groups may vary over a wide range. Preferably, however, at least one of the organic compounds containing at least two active hydrogen containing groups which is used in the production of the polyurethane plastic has a molecular weight of at least about 200 and preferably between about 500 and about 5000 with an hydroxyl number within the range of from about 25 to about 800 and acid numbers, where applicable, below about 5. A satisfactory upper limit for the molecular weight of the organic compound containing at least two active hydrogen containing groups is about 10,000 but this limitation may vary so long as satisfactory mixing of the organic compound containing at least two active hydrogen containing groups with the organic polyisocyanate can be obtained. In addition to the high molecular weight organic compound containing at least two active hydrogen containing groups, it is desirable to use an organic compound of this type having a molecular weight below about 750 and preferably below about 500. Aliphatic diols and triols are most preferred for this purpose.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha, beta-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-butylene glycol, 1,2-propylene glycol, 1,4-butylene glycol, 1,3-butylene glycol, 1,5-pentane diol, 1,4-pentane diol, 1,3-pentane diol, 1,6-hexane diol, 1,7-heptane diol, glycerine, trimethylolpropane, 1,3,6-hexanetriol, triethanolamine, pentaerythritol, sorbitol and the like.

Any suitable polyhydric polyalkylene ether may be used such as, for example, the condensation product of an alkylene oxide beginning with any suitable initiator. The initiator may be difunctional compound including water so that the resulting polyether is essentially a chain of repeating alkylene oxy groups as in polyethylene ether glycol, polypropylene ether glycol polybutylene ether glycol and the like; or the initiator may be any suitable active hydrogen containing compound which may be a monomer or even a compound having a relatively high molecular weight including other active hydrogen containing compounds as disclosed above. It is preferred that the initiator have from 2 to 8 active sites to which the alkylene oxides may add including for example, amines, alcohols and the like. Any suitable alkylene oxide may be used such as, for example, ethylene oxide, propylene oxide, butylene oxide, amylene oxide, tetrahydrofuran, epihalohydrins such as epichlorohydrin, styrene oxide and the like. Any suitable initiator may be used including, for example, water, polyhydric alcohols, preferably having 2 to 8 hydroxyl groups, amines, preferably having 2 to 8 replaceable hydrogen atoms bonded to nitrogen atoms. Phosphorous acids may also be used, but the phosphorous compounds are somewhat peculiar in that a different mode of preparation may be required, as more particularly set forth below. The resulting polyhydric polyalkylene ethers with the various bases of nitrogen, phosphorous and the like may have either primary or secondary hydroxyl groups or mixtures of primary and secondary hydroxyl groups. It is preferred to use alkylene oxides which contain from 2 to 5 carbon atoms and, generally speaking, it is advantageous to condense from about 5 to about 30 mols of alkylene oxide per functional group of the initiator. There are many desirable processes for the preparation of polyhydric polyalkylene ethers including U.S. Patents 1,922,459, 3,009,939 and 3,061,625 or by the process disclosed by Wurtz in 1859 and in Encyclopedia of Chemical Technology, volume 7, pages 257 to 262, published by Interscience Publishers, Inc. (1951).

Specific examples of initiators are water, ethylene glycol, propylene glycol, glycerine, trimethylol propane, pentaerythritol, arabitol, sorbitol, maltose, sucrose, ammonia, diethanolamine, triethanolamine, dipropanolamine, tripropanolamine, diethanolpropanolamine, tributanolamine, 2,4-tolylene diamine, 4,4'-diphenylmethane, p,p',p''-triphenylmethane triamine, ethylene diamine, propylene diamine, propylene triamine, N,N,N',N'-tetrakis-(2-hydroxypropyl) ethylene diamine, diethylene triamine and the like. The phosphorous containing polyols are more fully described below.

Any suitable polyhydric polythioether may be used such as, for example, the condensation product of thiodiglycol or the reaction product of a polyhydric alcohol such as is disclosed above for the preparation of the hydroxyl polyesters with any other suitable thioetherglycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used such as, for example, the reaction product of formaldehyde or other suitable aldehyde with a polyhydric alcohol such as those disclosed above for use in the preparation of the hydroxyl polyesters.

Any suitable aliphatic polyol may be used such as, for example, alkane diols such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexane diol, 1,7-heptane diol, 2,2-dimethyl-1,3-propane diol, 1,8-octane diol and the like; including 1,20-eicosane diol and the like; alkene diols such as, for example, 1-butene-1,4-diol, 1,3-butadiene-1,4-diol, 2-pentene-1,5-diol, 2-hexene-1,6-diol, 2-heptene-1,7-diol and the like; alkyne diols such as, for example 2-butyne-1,4-diol, 1,5-hexadiyne-1,6-diol and the like; alkane triols such as for example, 1,3,6-hexanetriol, 1,3,7-heptane triol, 1,4,8-octane triol, 1,6,12-dodecane triol and the like; alkene triols such as 1-hexene-1,3,6-triol and the like; alkyne triols such as 2-hexyne-1,3,6-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamine may be used including for example aromatic polyamines such as, for example, p-amino aniline, 1,5-diamino naphthalene, 2,4-diamino toluylene, 1,3,5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridene, 2,4-diamino-5-aminomethyl pyrimidine, 2,5-diamino-1,3,4-thiadiazol and the like.

Phosphorous containing compounds are often advantageously used because of the flame retarding effect which they impart to the resulting plastics. These compounds often contain 1 or 2 phosphorous atoms as a nucleus and then have alkylene oxide side chains bonded to the phosphorous nucleus through either phosphate or phosphite type linkages. The phosphate compounds are advantageously prepared by condensing a mixture of phosphorous pentoxide and water with an alkylene oxide as more particularly set forth above. It is advantageous to use mixtures of phosphorous pentoxide and water which correspond to about 80 percent phosphorous pentoxide and about 20 percent water. But any amount within the range of about 65 percent to 90 percent phosphorous pentoxide and the balance water may be used and the whole range is contemplated. The phosphites are advantageously prepared in accordance with the method of U.S. Patent 3,009,929 where triphenyl phosphite, for example, is reacted with a polypropylene ether glycol to prepare a product having a molecular weight of about 500. Other processes are disclosed in the patent. It is also possible to use polyethers based on phosphorous which contain nitrogen atoms in addition to the phosphorous atoms. These compounds may be represented by the general formula

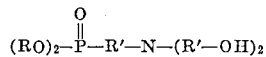

wherein R is lower alkyl or phenyl, for example, methyl, ethyl, propyl, butyl and the like and R' is alkylene, preferably having from 1 to 4 carbon atoms such as, methylene, ethylene, 1,2-propylene, 1,4-butylene and the like. A preferred compound is dioxyethylene-N,N-bis-(2-hydroxyethyl) aminomethyl phosphate.

Any of the compounds of any of the classes set forth above may be substituted with halogen such as, for example, chloro, bromo, iodo and the like; nitro; alkoxy, such as, for example, methoxy, ethoxy, propoxy, butoxy and the like; carboalkoxy such as, for example, carbomethoxy, carbethoxy and the like; dialkyl amino such as, for example, dimethyl amino, dipropyl amino, methylethyl amino and the like; mercapto, carbonyl, thiocarbonyl, phosphoryl, phosphato and the like.

The polyisocyanates of the invention are useful for the preparation of cellular polyurethane plastics by reaction thereof with an active hydrogen containing compound in the presence of a blowing agent. Suitable processes for the preparation of cellular polyurethane plastics are disclosed in U.S. Reissue Patent 24,514 together with suitable machinery to be used in conjunction therewith. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polyol of the present invention to prepare a prepolymer having free —NCO groups which is then reacted in a second step with water to prepare a foam. Alternately, the components may be reacted in a single working step. Furthermore, instead of water, low boiling hydrocarbons such as pentane, hexane, heptane, pentene, heptene and the like; azo compounds such as azohexahydrobenzodinitrile and the like, halogenated hydrocarbons such as, dichlorodifluoroethane, dichlorodifluoromethane, trichlorofluoromethane, vinylidene chloride, methylene chloride, and the like may be used as blowing agents. It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula

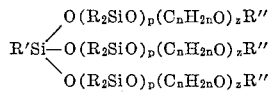

wherein R, R' and R" are alkyl radicals having 1 to 4 carbon atoms; p, q and r each have a value of from 4 to 8 and $(C_nH_{2n}O)_z$ is a mixed polyoxyethylene oxypropylene group containing from 15 to 19 oxyethylene units and from 11 to 15 oxypropylene units with z equal to from about 26 to about 34. Most preferred is a compound having the formula

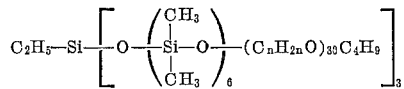

wherein $(C_nH_{2n}O)$ is a mixed polyoxyethylene and oxypropylene block copolymer containing about 17 oxyethylene units and about 13 oxypropylene units. Other suitable stabilizers are disclosed in Canadian Patents 668,537, 668,478 and 670,091. Other suitable compounds may therefore have the formula.

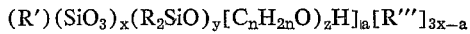

where X is an integer and represents the number of trifunctional silicone atoms bonded to a single monovalent or polyvalent hydrocarbon radical, R'; R is a monovalent hydrocarbon group as defined above; $a$ is an integer having a value of at least 1 and represents the number of polyoxyalkylene chains in the block copolymer; y is an integer having a value of at least 3 and denotes the number of difunctional siloxane units, n is an integer from 2 to 4 denoting the number of carbon atoms in the oxyalkylene group; and z is an integer having a value of at least 5 and denotes the length of the oxyalkylene chain. It will be understood further that such compositions of matter are mixtures of such block copolymers wherein y and z are of different values and that method of determining the chain length of the polysiloxane chains and the polyalkylene chains give values which represent average chain lengths. In the above formula, R represents monovalent hydrocarbon radicals, such as alkyl, aryl or aralkyl radicals, the polyoxyalkylene chain terminates with a hydrogen atom, R''' is an alkyl radical or a trihydrocarbonsilyl radical having the formula $R_3Si$— where R is a monovalent hydrocarbon radical and terminates a siloxane chain, and R' represents a monovalent or polyvalent hydrocarbon radical, being monovalent when x is 1, divalent when x is 2, trivalent when x is 3, tetravalent when x is 4.

One type of block copolymer is represented when x in the above formula is one, and in this instance a branched chain formula may be postulated as follows:

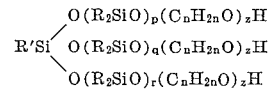

where $p+q+r$ has a minimum value of 3, the other subscripts being the same as in the immediately foregoing formula. In this instance, all three of the oxyalkylene chains are joined to the end of polysiloxane chains of the type —$(R_2SiO)$—. Specifically, one could use

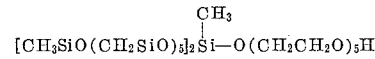

Any suitable catalyst may be used to speed up the reaction if desired such as, for example, dimethyl benzylamine, dimethyl stearyl amine, permethylated diethylene triamine, N-methyl - N' - dimethylaminoethyl piperazine, N,N'-endoethylene piperazine, N-alkyl morpholines; tertiary aminoethers such as, for example, 1-alkoxy-3-dialkylamino-propane, tertiary amines with ester groups, salts of tertiary amines, especially with organic acids such as, for example, oleic acid, benzoic acid, and the like, dibutyl tin dilaurate, dibutyl tin di-2-ethyl hexoate, dibutyl-tin-bis-(dimethylamino caproate), stannous octoate, stannous oleate, lead naphthenate, ferric acetylacetonate, mixtures thereof and any other catalyst which will promote the reaction between isocyanate groups and active hydrogen atoms as determined by the Zerewitinoff method as those disclosed in "Catalysis of the Isocyanate-Hydroxyl Reaction," J. W. Britain and P. G. Gemeinhardt, Journal of Applied Polymer Science, volume IV, issue No. 11, pages 207–211 (1960).

The polyisocyanates of the invention may also be used for the production of coating compositions. In this case, the organic compound containing active hydrogen containing groups is reacted with the polyisocyanates of the invention in an inert organic solvent therefor, such as, for example, ethyl acetate, methyl formamide, the diethyl ether of diethylene glycol, benzene, xylene, benzine and the like.

A particularly preferred coating composition is based on a solution of a branched polyester, for example, one obtained by reacting a trihydric alcohol, a dihydric alcohol and dicarboxylic acid together in a first step to prepare a polyester having an hydroxyl number of from about 50 to about 150; then combining the resulting polyester with an organic solvent such as, for example, the methyl ether of ethylene glycol acetate, preferably at approximately a 50 percent solution, then reacting the resulting solution of the polyester with a solution of carbamyl biuret polyisocyanate. Any suitable trihydric alcohol may be used in the preparation of the polyester such as, for example, glycerine, trimethylol propane, 1,2,6-hexane triol and the like and any suitable dihydric alcohol may be used such as, for example, 1,4-butylene glycol, 1,3-butylene glycol, ethylene glycol or the like. Any suitable dicarboxylic acid may be used such as, for example, adipic acid, sebacic acid or the like. It is to be understood that this is a preferred formulation and that coating compositions with the other active hydrogen containing compounds are also contemplated by the invention.

It is also possible to use the polyisocyanates of the invention in the preparation of elastomeric products which are nonporous for example by reacting an organic compound containing active hydrogen containing groups with an excess of the polyisocyanate of the invention in a first step to prepare an isocyanato-terminated prepolymer under anhydrous conditions. It is then reacted in a second step with a chain extending agent such as, for example, 1,4-butane diol, 1,3-butane diol, the bis-beta-hydroxy ethyl ether of hydroquinone, water or the like by mixing the crosslinking agent with the prepolymer and casting the resulting mixture in a mold.

The polyurethane plastics of the invention are useful where polyurethanes have been used heretofore. For example, the foams are useful for cushions and especially rigid foams are useful for both sound and thermal insulation, for example, for walls of buildings. The coatings may be used to coat wood or metals such as steel and the like. The elastomers are useful, for example, for the production of tires or for molded items such as gear wheels or the like.

The invention is further illustrated by the following examples in which parts are by weight unless otherwise specified.

Example 1

About 1008 g. (about 6 mols) of hexamethylene diisocynate are heated to about 120° C. after removal of the atmospheric oxygen with nitrogen and about 17 g. (about 1 mol) of gaseous ammonia are then introduced in the course of about 15 minutes. By using a long reaction vessel and by stirring vigorously, for example by means of a vibration mixer, the ammonia gas is finely distributed and completely absorbed before reaching the surface of the liquid so that no polyurea will be deposited on the walls of the gas vessel. After the ammonia has been absorbed, the reaction mixture contains about 43.0 percent of isocyanate, and after further heating to about 120° C. for about 3 hours, the isocyanate content is about 36.8 percent, corresponding to the isocyanate content of a solution of a carbamyl biuret produced from about 3 mols of hexamethylene diisocyanate and about 1 mol of ammonia in about 3 mols of hexamethylene diisocyanate. After cooling to room temperature, a colorless clear, thinly liquid product with a viscosity of about 49.8 cp./25° C. is obtained.

By repeatedly extracting the reaction mixture with a n-hexane at room temperature, the hexamethylene diisocyanate is separated almost completely. After removing small quantities of n-hexane from the residue by heating to about 50° C. in a vacuum produced by a water-jet vacuum pump, a polyisocyanate having a carbamyl biuret structure and with an isocyanate content of about 26.0 percent and a viscosity of about 991 cp./25° C. is left behind.

Example 2

If, in the method used in Example 1, about 504 g. of hexamethylene diisocyanate are treated with about 17 g. of gaseous ammonia, which corresponds to a molar ratio of about 3:1, and the reaction product is heated until the isocyanate content is about 24.2 percent, a highly viscous polyisocyanate having a carbamyl biuret structure is obtained.

Example 3

Using the method described in Example 1, about 14 g. of ammonia gas are conducted, in the course of about 25 minutes, into about 701 g. of cyclohexyl-1,4-diisocyanate at about 154° C. This corresponds to a molar ratio of about 5.13:1. As soon as all the ammonia has been introduced, the isocyanate content is about 41.4 percent, and after heating for several hours at about 135° C., it is about 34.9 percent. This mixture of polyisocyanate, which has a carbamyl biuret structure, and cyclohexyl diisocyanate is a semicrystalline, waxy yellow-brown product at room temperature.

Example 4

As described in Example 3, cyclohexyl-1,4-diisocyanate and ammonia are reacted together at about 140° C. in a molar ratio of about 9.14:1 and then further heated for about one hour at the same temperature until the isocyanate content is about 40 percent, which corresponds to a solution of a polyisocyanate with carbamyl biuret structure in cyclohexyl-1,4-diisocyanate.

Example 5

About 505 g. of dicyclohexyl methane-4,4'-diisocyanate and about 5.28 g. of ammonia gas (molar ratio about 6:1) are reacted at about 170° C. as described in Example 1. When all the ammonia has been introduced, the isocyanate content is about 24.2 percent, and after heating for about one-half hour at about 170° C. it is about 22.5 percent. A pale yellow, slightly turbid product which is highly viscous at room temperature is obtained.

Example 6

About 504 g. (about 3 mols) of hexamethylene diisocyanate are heated to about 150° C. after all the atmospheric oxygen has been displaced with dry nitrogen, and about 22.5 g. (about 0.5 mol) of anhydrous formamide is then added drop by drop while stirring vigorously in the course of about one hour. As soon as carbon monoxide begins to split off, the reaction temperature is reduced to about 135° C. and heating is continued until about 14 g. (about 0.5 mol) of carbon monoxide have escaped. A pale yellow, clear liquid with an isocyanate content of about 29.5 percent and a viscosity of about 676 cp./25° C. is obtained.

Example 7

About 17 parts of ammonia in the form of a mixture with nitrogen which acts as carrier gas are introduced in the course of about 2½ hours at about 80 to 90° C. while stirring vigorously into about 1044 parts of toluylene-2,4-diisocyanate. The tube through which the ammonia is introduced extends to the bottom of the vessel to insure that the ammonia remains as long as possible in the toluylene-2,4-diisocyanate. The —NCO content immediately after addition of ammonia is about 39.5 percent, which corresponds to a mixture of about 1 mol biuret diisocyanate, formed from about 2 mols tolylene-2,4-diisocyanate and about 1 mol ammonia, in about 4 mols of toluylene-2,4-diisocyanate. The reaction mixture is heated for about 14 hours at about 120° C. in an atmosphere of nitrogen as protective gas. There is a continuous reduction in the —NCO content until it drops to 26.8 percent.

The viscous reaction mixture is now filled into two metal containers in which it is heated at about 120° C. for about 15 hours and about 66 hours respectively. After cooling, golden yellow brittle polyisocyanates having a carbamyl biuret structure are obtained in both cases (—NCO contents about 25.2 percent and about 24.7 percent respectively). The resins are very easily soluble in acetone, ethyl acetate, tetrahydrofuran and methylene chloride. They are insoluble in aliphatic hydrocarbons. Approximately 50 percent solutions of the polyisocyanates in ethyl acetate have a viscosity of about 15.6 and about 21.3 cp./25° C. respectively.

Small quantities of monomeric toluylene-2,4-diisocyanate remaining in the polyisocyanates may be removed by extracting the powdered resins with n-hexane.

*Example 8*

About 20 parts of ammonia, present as a mixture with nitrogen are introduced in the course of about 3 hours at about 120° C. into a mixture of about 650 parts of toluylene-2,4-diisocyanate and about 350 parts of toluylene-2,6-diisocyanate, the reaction components being mixed intensely. The —NCO content immediately after the reaction with ammonia is about 33.8 percent. On further heating at the same temperature, a continuous reduction in the —NCO content is observed, and after about 8 hours the —NCO content has fallen to about 24.5 percent. A slight turbidity is observed in the reaction mixture when the —NCO value is about 29.6 percent, and this turbidity disappears almost completely as the reaction continues.

About 71 parts of an approximately 50 percent solution of polyisocyanate with carbamyl biuret structure in ethyl acetate (—NCO content of the solution about 12.2 percent) are mixed with about 100 parts of an approximately 50 percent solution in methyl glycol acetate of a branched polyester obtained from trimethylol propane, 1,3-butylene glycol and adipic acid, the OH content of the solution of the polyester being about 3.5 percent. When this combination is applied in the form of a thin layer on a base, a firmly adhering glossy lacquer coating insoluble in organic solvents is obtained after about 24 hours.

*Example 9*

About 20 parts of pulverized hexamethylene diurea are introduced in separate portions in the course of one hour into about 400 parts of hexamethylene diisocyanate. The hexamethylene diisocyanate is heated to about 130° C. before the reaction begins. The hexamethylene diurea is added in such portions that the reaction temperature of the mixture does not rise above about 135° C. When the addition of the diurea is completed, only small quantities of heavily soluble polyureas have formed. The solution of polyisocyanate having a carbamyl biuret structure in hexamethylene diisocyanate is filtered, the clear yellow solution is freed from hexamethylene diisocyanate at about 0.2 mm. of Hg and finally the last residues of this diisocyanate are removed by boiling about 5 times with cyclohexane. The clear polyisocyanate having a carbamyl biuret structure, which has the appearance of honey, can be poured easily. —NCO content: about 18.4 percent, yield: about 80 parts. In a tetraisocyanate, i.e., one having the formula:

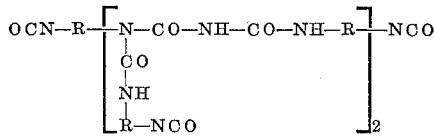

where R is (—CH$_2$—)$_6$, the theoretical —NCO content is calculated to be about 19.2 percent.

*Example 10*

About 680 parts of hexamethylene diisocyanate are heated to about 98° C. About 5.4 parts of an approximately 25 percent aqueous ammonia solution are added dropwise over about 3 hours and the mixture is stirred thoroughly. At the same time, about 3.9 parts of gaseous ammonia are introduced through a tube into the reaction vessel so that water and ammonia are made to react in approximately equivalent quantities on the diisocyanate. When the addition of water and ammonia is completed, the temperature is raised to about 120° C. for about one hour. When the solution is cold, it is filtered, and about 2 parts of an insoluble polyurea are separated. The clear, filtered solution is freed from hexamethylene diisocyanate at 0.2 mm. of Hg. About 160 parts of a mixture of polyisocyanates with carbamyl biuret structure are obtained. —NCO content: about 17.8 percent.

*Example 11*

17 g. (1 mol) of ammonia are introduced in the course of half an hour at 130° C. into 1392 g. (8 mols) of toluylene-2,4-diisocyanate. After short stirring the isocyanate content of the reaction mixture is 40.3 percent.

625 g. of this carbamyl biuret polyisocyanate reaction mixture containing unreacted diisocyanate and 375 g. of the addition product of propylene oxide to trimethylol propane (OH number 56) are mixed at room temperature and are heated for one hour at 80° C. The prepolymer thus obtained has an isocyanate content of 23.2 percent. 100 g. of this prepolymer are mixed with 5 g. of water, 0.3 g. of endo ethylene piperazine and 1 g. of the silicone oil of the formula

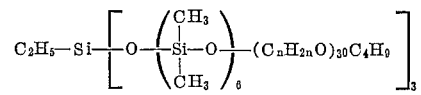

wherein (C$_n$H$_{2n}$O) is a mixed polyoxyethylene and oxypropylene block copolymer containing about 17 oxyethylene units and about 13 oxypropylene units. The mixture expands to give a semi-rigid foam with a density of 13.1 kg./m.$^3$ with open pores and good dimensional stability.

It is to be understood that the foregoing working examples are given for the purpose of illustration and that any other suitable carbamyl biuret, polyisocyanate, active hydrogen containing compound, organic diisocyanate, solvent or the like could have been used provided that the teachings of this disclosure are followed.

Although the invention has been described in considerable in the foregoing, it is to be understood that such detail is solely for the purpose of illustration and that many variations can be made by those skilled in the art without departing from the spirit and scope of the invention except as set forth in the claims.

What is claimed is:

1. As a composition of matter, a carbamyl biuret polyisocyanate having the formula

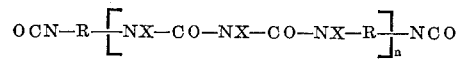

wherein X is selected from the group consisting of hydrogen and —CO—NX—R—NCO and at least one of said group members is —CO—NX—R—NCO, R is a divalent organic radical obtained by removing the —NCO groups from an organic diisocyanate selected from the group consisting of tetramethylene diisocyanate, hexamethylene diisocyanate, decamethylene diisocyanate, cyclohexane-1,4-diisocyanate, dicyclohexylmethane-4,4'-diisocyanate, meta-xylylene diisocyanate, para-xylylene diisocyanate, meta-phenylene diisocyanate, para-phenylene diisocyanate, a diphenylmethane-4,4'-diisocyanate, 1,3-diisocyanato-methyl cyclobutane, toluylene-2,4-diisocyanate, toluylene-2,6-diisocyanate, 1-chlorobenzene-2,4-diisocyanate, 1-methyl cyclohexane-2,4-diisocyanate and 1-methyl cyclohexane-2,6-diisocyanate and $n$ is a positive integer of 1 to 4.

2. The composition of claim 1 wherein only one X is —CO—NX—R—NCO per repeating unit recited.

3. As a composition of matter, a carbamyl biuret polyisocyanate having the formula

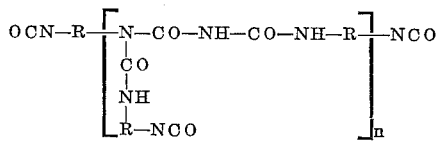

wherein R is obtained by removing the —NCO groups from an isocyanate selected from the group consisting of hexamethylene diisocyanate, cyclohexane diisocyanate and toluylene diisocyanate and $n$ is a positive integer of from 1 to 4.

4. As a composition of matter, a carbamyl biuret polyisocyanate having the formula

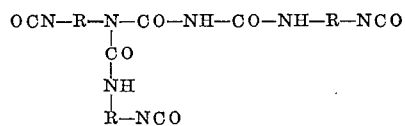

wherein R is obtained by removing the —NCO groups from an isocyanate selected from the group consisting of hexamethylene diisocyanate, cyclohexane diisocyanate and toluylene diisocyanate.

References Cited by the Examiner

UNITED STATES PATENTS 3,124,605  3/1964  Wagner _____ 260—453

OTHER REFERENCES

Bayer Angewandte Chemie, September 1947, volume 59, No. 9, pp. 257–288 (p. 263 relied on).

CHARLES B. PARKER, *Primary Examiner.*

DALE R. MAHANAND, *Assistant Examiner.*